M. J. SELZER.
CUSHION TIRE FOR VEHICLE WHEELS.
APPLICATION FILED MAR. 2, 1911.
1,026,468.
Patented May 14, 1912.
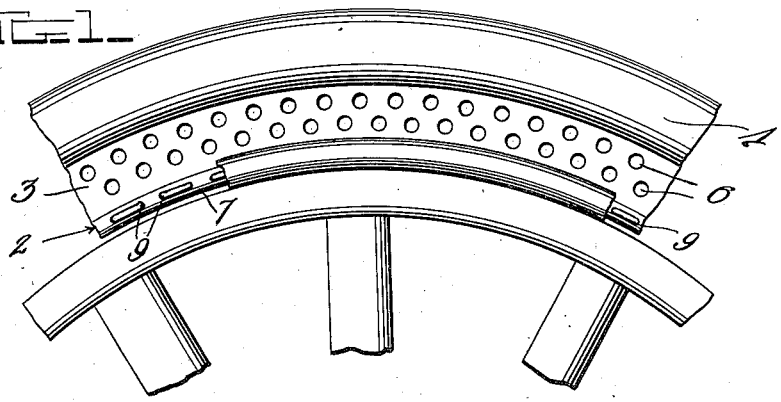
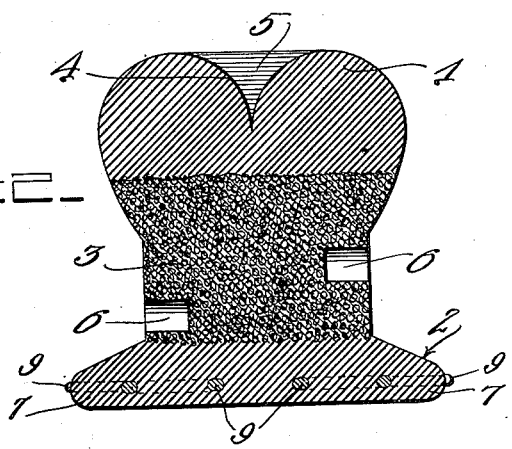
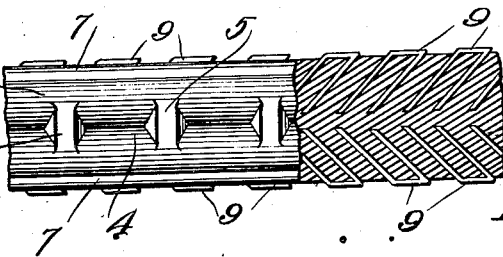
Witnesses
J. R. Pierce
O. B. Hopkins
Inventor
M. J. Selzer.
by H. D. Williston & Co.
Attorneys

UNITED STATES PATENT OFFICE.

MICHEL J. SELZER, OF AKRON, OHIO, ASSIGNOR TO THE AMERICAN TIRE & RUBBER COMPANY, OF AKRON, OHIO.

CUSHION-TIRE FOR VEHICLE-WHEELS.

1,026,468.  Specification of Letters Patent.  Patented May 14, 1912.

Application filed March 2, 1911. Serial No. 611,750.

*To all whom it may concern:*

Be it known that I, MICHEL J. SELZER, a citizen of the United States, residing at Akron, in the county of Summit and State of Ohio, have invented certain new and useful Improvements in Cushion-Tires for Vehicle-Wheels; and I do declare the following to be a full, clear, and exact description of the invention, such as will enable others skilled in the art to which it appertains to make and use the same.

This invention relates to improvements in cushion tires for vehicle wheels.

One object of the invention is to provide an improved construction of cushion tire which possesses a high degree of elasticity or resiliency and in which the disadvantages of the pneumatic tire are eliminated.

A further object is to provide an improved means for reinforcing the base portion of the tire whereby the same will be prevented from being pulled out of engagement with the clencher rim of the tire.

With these and other objects in view, the invention consists of certain novel features of construction and combination and arrangement of parts as will be fully described hereinafter and afterward specifically claimed.

In the accompanying drawings: Figure 1 is a side view of a portion of a wheel and cushion tire constructed in accordance with my invention; Fig. 2 is a cross sectional view of the tire on an enlarged scale. Fig. 3 is a plan view of a portion of the tire, a part of which is shown in section to illustrate the arrangement of the reinforcing devices in the base of the tire.

My improved tire comprises an outer or tread portion 1 formed of tough hard rubber, an inner base or rim-engaging portion 2 of the same material and an intermediate portion 3 formed of soft, elastic rubber.

The outer tread portion 1 of the tire is preferably rounded on its outer surface and has formed therein a centrally disposed annular V-shaped groove 4 across which at suitable intervals and spaced equi-distant apart are integrally formed bridge members 5, the outer edges of which are flush with the tread surfaces of the adjacent outer portion 1 of the tire. The bridge members 5 when thus arranged serve as anti-slipping devices whereby the tire is prevented from skidding.

The intermediate portion 3, as hereinbefore stated is formed of soft yielding or elastic rubber or composition of rubber having these qualities. The resiliency of the portion 3 is further increased by a double row of holes or recesses 6 formed in the opposite sides of said portion. The holes 6 of one row are preferably arranged opposite the spaces between the holes of the other row on each side of the tire. The elastic portion 3 of the tire is of less width than the outer hard tread portion 1 and is protected by the projecting sides of said outer portion.

The inner portion 2 may be formed in any suitable shape to fit the rim of the wheel with which the same is to be engaged and is here shown as being provided with laterally extending flanges 7 to fit a clencher rim.

In the base of the rim engaging portion 2 and flanges 7 are embedded series of diagonally arranged metal reinforcing rods 8, said rods being molded in the base when the tire is formed or driven or forced into the same after the tire is formed.

The reinforcing rods 8 are preferably in the form of staples, being connected at their outer ends as at 9 the rods 8 forming the legs of the staples, arranged in parallel relation in the opposite sides of the base, preferably at an angle of substantially 45° and substantially at right angles to each other with their inner ends substantially in the center of the base as shown. By thus arranging the reinforcing rods the base 2 and attaching flanges 7 are strengthened and stiffened so that when engaged with the clencher rim of the wheel will be securely held in position on the wheel and cannot be pulled out of engagement with the rim.

From the foregoing description taken in connection with the accompanying drawings the construction and operation of the invention will be readily understood without requiring a more extended explanation.

Various changes in the form, proportion and the minor details of construction will be resorted to without departing from the principle or sacrificing any of the advantages of the invention as defined in the appended claim.

Having thus described my invention, what I claim is:

A cushion tire comprising an inner base portion formed of hard tough material, rim engaging flanges formed on said inner base portion, and series of parallel reinforcing rods arranged in rows in the base and rim engaging flanges, the rods of one row being disposed at substantially right angles to the rods of the other row, said rods being connected at their outer ends to form staple shaped members.

In testimony whereof I have hereunto set my hand in presence of two subscribing witnesses.

MICHEL J. SELZER.

Witnesses:
   D. F. FELMBY,
   SUSIE SELZER.